United States Patent
Martin et al.

(10) Patent No.: US 9,608,935 B2
(45) Date of Patent: Mar. 28, 2017

(54) TUNNELING WITHIN A NETWORK-ON-CHIP TOPOLOGY

(71) Applicant: QUALCOMM Technologies Inc., San Diego, CA (US)

(72) Inventors: Philippe Martin, Roquefort les Pins (FR); Philippe Boucard, Le Chesnay (FR)

(73) Assignee: Qualcomm Technologies, Inc., San Diego, CA (US)

( * ) Notice: Subject to any disclaimer, the term of this patent is extended or adjusted under 35 U.S.C. 154(b) by 95 days.

(21) Appl. No.: 14/479,728

(22) Filed: Sep. 8, 2014

(65) Prior Publication Data

US 2016/0072731 A1 Mar. 10, 2016

(51) Int. Cl.
*H04L 12/933* (2013.01)
*H04L 12/805* (2013.01)
*H04L 12/865* (2013.01)
*H04L 12/863* (2013.01)
*G06F 15/78* (2006.01)

(52) U.S. Cl.
CPC ........ *H04L 49/109* (2013.01); *G06F 15/7825* (2013.01); *H04L 47/365* (2013.01); *H04L 47/628* (2013.01); *H04L 47/6275* (2013.01)

(58) Field of Classification Search
None
See application file for complete search history.

(56) References Cited

U.S. PATENT DOCUMENTS

| | | |
|---|---|---|
| 2006/0209846 A1 | 9/2006 | Clermidy et al. |
| 2009/0010161 A1 | 1/2009 | Zhang et al. |
| 2011/0110381 A1* | 5/2011 | Atkinson ............. H04L 47/125 370/419 |
| 2013/0051397 A1 | 2/2013 | Guo et al. |

(Continued)

FOREIGN PATENT DOCUMENTS

WO 2013101794 A1 7/2013

OTHER PUBLICATIONS

Daily W.J., et al., "Route Packets, not Wires: on-chip Interconnection Networks," proceedings of the 38th. Annual Design Automation Conference. (DAC). Las Vegas, NV, Jun. 18-22, 2001; [Proceedings of The Design Automation Conference], New York, NY : ACM, US, vol. Conf. 38, Jun. 18, 2001.

(Continued)

*Primary Examiner* — Mohammad Adhami
(74) *Attorney, Agent, or Firm* — Muncy, Geissler, Olds & Lowe, P.C.

(57) ABSTRACT

Systems and methods relate to a network on chip (NoC) which includes one or more channels configured to carry data packets in a first direction, the first direction having an upstream end and a downstream end. A tunnel is configured between an upstream element at the upstream end and a downstream element at the downstream end. The tunnel includes common wires which are shared by the one or more channels. The tunnel is configured to transmit data packets of two or more formats on the common wires based on common signals. common signals comprise data signals to transmit one or more of data, control, or debug information belonging to the data packets on the common wires, and framing signals to control transmission of the data signals on the common wires.

8 Claims, 2 Drawing Sheets

(56) References Cited

U.S. PATENT DOCUMENTS

| | | |
|---|---|---|
| 2013/0136129 A1 | 5/2013 | Locatelli et al. |
| 2015/0131668 A1* | 5/2015 | Kumar .................. H04L 45/30 370/395.5 |
| 2015/0188847 A1* | 7/2015 | Chopra ................ H04L 45/306 370/401 |

OTHER PUBLICATIONS

Morgenshtein A., et al., "Link Division Multiplexing (LDM) for Network-on-Chip Links," Electrical and Electronics Engineers in Israel, 2006 IEEE 24th Convent Ion of, IEEE, PI, Nov. 1, 2006 (Nov. 1, 2006), pp. 245-249, XP031052748, ISBN: 978-1-4244-0229-8.
Partial International Search Report—PCT/US2015/046557—ISA/EPO—Feb. 4, 2016.
International Search Report and Written Opinion—PCT/US2015/046557—ISA/EPO—Jun. 21, 2016.

* cited by examiner

TUNNELING WITHIN A NETWORK-ON-CHIP TOPOLOGY

FIELD OF DISCLOSURE

Disclosed aspects are directed to data communication in a network-on-chip (NoC) using a tunnel. In exemplary aspects, the tunnel is packet format agnostic and configured to transmit data packets of two or more formats on common wires of the tunnel, which are shared by one or more channels of the NoC, using common signals.

BACKGROUND

For processing systems, designs of systems on chip (SoCs) involve routing between various system components integrated on a semiconductor chip. Wire routing congestion tends to be a challenge in designing networks-on-chip (NoCs) for the various routing requirements of the SoCs. Long wires and buses are particularly difficult for routing and may be prone to errors and data loss. Further, the use of dedicated wires for data communication between two entities may lead to inefficiencies. For example, while some wires may be over-utilized, there may be some wires which are under-utilized. Further, different packet formats in which data may be packaged may require different types of wires and transmission protocols. Sharing data traffic across wires in an effort to promote uniform utilization may lead to conflicts between various types or formats of data communicated among the various wires of a NoC.

Accordingly, a need exists for reducing the number of wires, as well as, improving the efficiency of utilization of existing wires of a network-on-chip (NoC).

SUMMARY

Exemplary aspects of this disclosure include systems and methods related to a network on chip (NoC) which includes one or more channels configured to carry data packets in a first direction, the first direction having an upstream end and a downstream end. A tunnel is configured between an upstream element at the upstream end and a downstream element at the downstream end. The tunnel includes common wires which are shared by the one or more channels. The tunnel is configured to transmit data packets of two or more formats on the common wires based on common signals. common signals comprise data signals to transmit one or more of data, control, or debug information belonging to the data packets on the common wires, and framing signals to control transmission of the data signals on the common wires.

For example, an exemplary aspect includes a network on chip (NoC) comprising: one or more channels configured to carry data packets in a first direction, the first direction comprising an upstream end and a downstream end, and a tunnel. The tunnel is configured between an upstream element at the upstream end and a downstream element at the downstream end. The tunnel comprises common wires which are shared by the one or more channels and the tunnel is configured to transmit data packets of two or more formats on the common wires using common signals.

Another exemplary aspect includes a method of operating a network on chip (NoC), the method comprising: configuring one or more channels to carry data packets in a first direction, the first direction comprising an upstream end and a downstream end, and transmitting the data packets from an upstream element on the upstream end to a downstream element on the downstream element on a tunnel comprising common wires which are shared by the one or more channels. Transmitting the data packets comprises transmitting data packets of two or more formats on the common wires of the tunnel, using common signals.

Yet another exemplary aspect includes system comprising: one or more channels to carry data packets in a first direction, the first direction comprising an upstream end and a downstream end, and means for transmitting the data packets from an upstream element on the upstream end to a downstream element on the downstream element. The means for transmitting comprises common wires which are shared by all the channels and the means for transmitting is configured to transmit data packets of two or more formats on the common wires using common signals.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
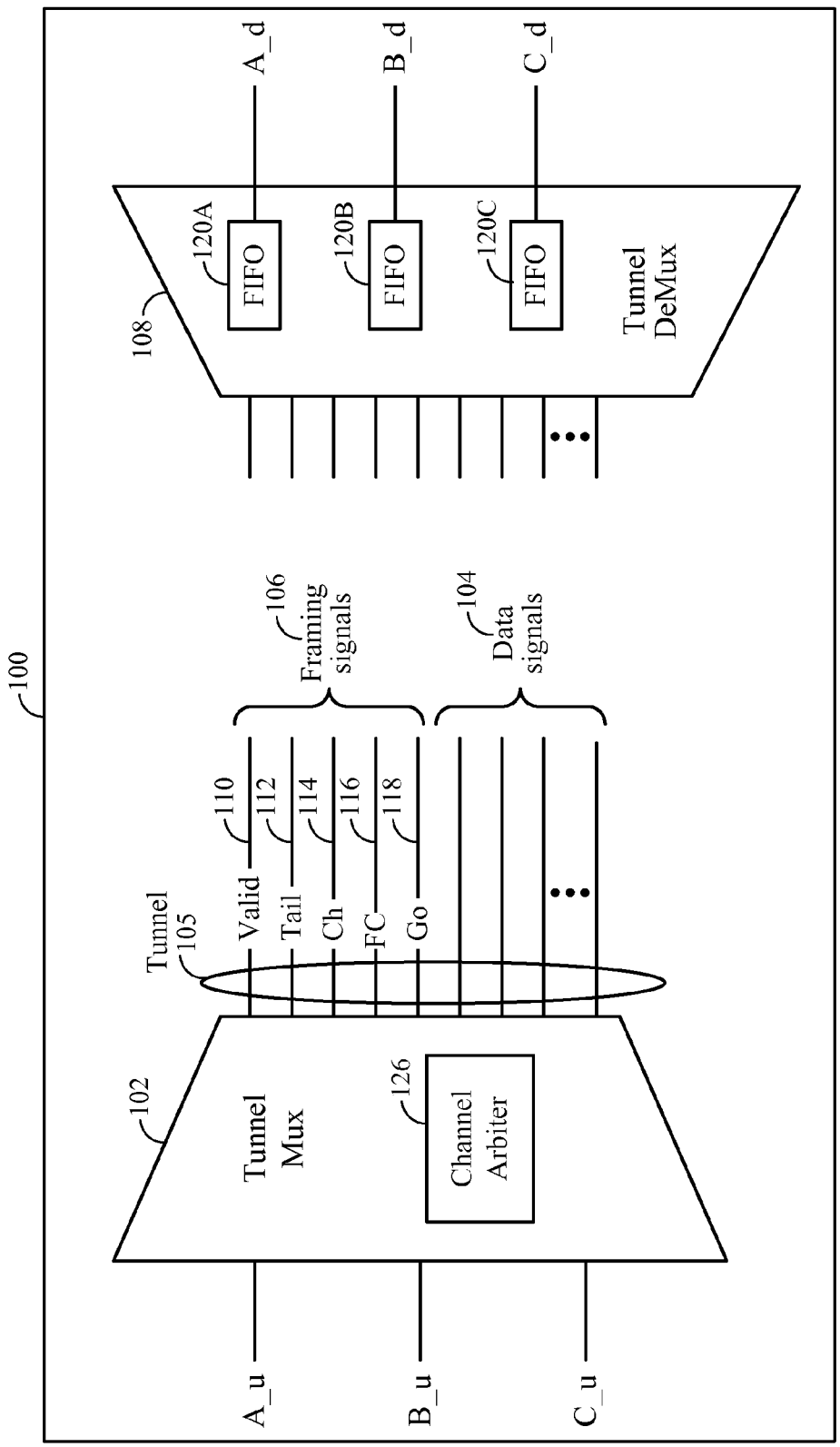
FIG. 1 illustrates an exemplary system configured for data communication between a sender and a receiver.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that specific circuits (e.g., application specific integrated circuits (ASICs)), one or more processors executing program instructions, or a combination of both, may perform the various actions described herein. Additionally, the sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Aspects of this disclosure are directed to implementation of tunnels configured to couple or link two or more network elements of a network on chip (NoC) through a shared set of physical wires. The tunnels may carry streams of data, or more specifically, streams of data packets. The terms "data" and "data signals," as used herein, can include signals or information pertaining to data, as well as other information, such as control information, debug information, etc. In this disclosure, data signals that are transmitted or transported on a tunnel can include all such related information such as data, control, debug, etc., but on the other hand, with regard to the transmission on the tunnel itself, further control signals are used, which will be explained with reference to the term "framing signals."

Accordingly, with the above definition of data or data signals in mind, a data "packet" may include one or more words of data, where a "word" may refer to the lowest granularity of a group of one or more data bits. An exemplary data packet may include a header and data payload (the data payload may simply be referred to as data hereafter). The header may contain information about the data, where such information may include control information, and/or information regarding the packet size, start and end words/fields, etc., which may make identification and handling of the data packets easy. Accordingly, the tunnels may comprise a physical medium through which two or more components of a system or two or more points of a NoC can communicate. A tunnel may carry streams of data packets, which may be of different formats or types. Since the tunnels can support data packet streams without limitation to any particular type or format, dedicated wires for the various data packet streams can be avoided.

In some aspects, the data packets of different formats can be sent on a common set of wires in the tunnel with the use of "common signals." The "common signals" include "data signals" which represent the data bits being transmitted, as well as the aforementioned "framing signals." The term "framing signals" has been employed in this disclosure to distinguish their functions from control information which may be included in the data signals being transmitted. As such, "framing signals" more specifically refer to control information which is used for controlling various aspects of transmission of the data signals on the common wires of the tunnel. The framing signals can control the transmission of the data packets of various formats on the tunnel. The data signals can also include data or data packets of any format that are transmitted on the common set of wires in the tunnel. Thus, the common signals which include data signals as well as framing signals can be used for transmission of two or more data packet formats on the common set of wires in the tunnel. In this manner, the exemplary tunnels are configured to be format agnostic and can flexibly support transmission of different formats and types of data packets.

In general, referring to a first direction or forward direction of data transfer between two network elements coupled by a tunnel, an upstream element may be configured to send or transmit data on the tunnel. A downstream element may be configured to receive the data. A second direction or reverse direction of data communication is also possible on the tunnel, where the functionalities of the upstream and downstream elements can be flipped, and as such a detailed description of the reverse direction will not be repeated, for the sake of brevity.

With continued reference to the first direction, data from one or more channels may feed the upstream element, pass through a shared set of wires in the tunnel, and be received by the downstream element. The downstream element may then forward the data to one or more channels on the downstream side of the NoC. In general, the one or more channels feeding the upstream element have a one-to-one correspondence between the one or more channels that drain the downstream element. Accordingly, it can be seen that in exemplary aspects, the tunnel may relieve wire congestion by implementing a shared set of wires between an upstream end and a downstream end of a NoC, thus avoiding dedicated sets of wires and related routing complexities for each of the dedicated sets of wires between these ends.

In order to explain the sharing of data across the shared set of wires in the tunnel, a non-limiting example of three channels A, B, and C of the NoC will be considered. The three channels are configured to carry data and may be connected to any number of one or more entities on the upstream end and any number of one or more entities on the downstream end. The tunnel may be implemented between two points or portions of the NoC, such that data on channel A, for example, enters the tunnel on the upstream end and exits the tunnel to continue downstream on channel A. Similarly, for channels B and C. Each of channels A, B, and C may carry data packets of different formats and these channels may have different bandwidths and/or number of wires going into/out of the tunnel. However, within the tunnel, the data may be reshaped. The data packets may be reshaped and mapped to a set of shared or common wires within the tunnel. Reshaping a data packet can include a modification in terms of one or more of a number of the common wires over which the data packet is transmitted, clock rate of transmission, or number of clock cycles consumed by the transmission. Aspects of reshaping, modifying, or remapping data packets on to the common wires of the tunnel may also be referred to as "serialization." The common wires in the tunnel are agnostic of the format of the data packets, such that the data packets from channels A, B, and C may be serialized on the common wires even if these data packets may be of different formats.

Accordingly, the tunnel acts as a packet transmission unit. However, the tunnel must not alter bit level content of a data packet. In exemplary aspects, the tunnel may look up the content of a data packet being transmitted for the sake of arbitration between data packets which may have a conflict on the shared or common wires; and the tunnel may change the "shape" of a data packet, which as described herein, may pertain to the number of wires, the clock rate or the number of clock cycles consumed by the transmission of a data packet.

At the upstream end, a network element referred to herein as a "tunneling multiplexer" (or more simply, "tunnel mux" or "mux") receives data from channels A, B, and C, and places them on the shared set of wires in the tunnel. The mux may reshape a data packet received from any one or more of channels A, B, and C. Further, the channels A, B, C may have different performance requirements, and more specifically, some data packets themselves may carry individual priorities. Thus, conflicts may arise between data packets or between channels. In case there are conflicts, which will be further explained in the following sections, another network element referred to herein as a "channel arbiter," or simply, "arbiter," may assist in resolving conflicts and determining which data packets may get precedence.

At the downstream end, a corresponding network element referred to as a "a tunneling demultiplexer" (or more simply, "tunnel demux" or "demux") receives the data packets from the tunnel and remaps them on to the channels A, B, and C. Since data packets may get reshaped, one or more buffers, such as first-in-first-out (FIFOs) may be implemented in the demux to gather the various words or bits of a data packet. Each channel may have a corresponding FIFO, which can be used to re-pack or remap the data packets. Data packets are meant to be atomic, in the sense, once the transmission of a data packet is started on a channel, it cannot be interrupted, and the transmission of the data packet must be completed before the transmission of another data packet on the same channel is started. The FIFOs may be used to store the portions of the reshaped data packets as they are received from the various common wires and then forward them on to the channels. This functionality of the FIFOs may also be referred to as a store-and-forward function.

In exemplary aspects, so-called "framing signals" are included in the tunnel. These framing signals include control information pertaining to data packets transmitted on the common wires. The framing signals may include information pertaining to the data packet, such as, the start/stop fields (or "words") of a data packet, if the common wires of the tunnel are currently transmitting a word of the data packet, or are idle (e.g., during a wait cycle) or whether they are invalid or equivalent of wait cycles, whether a word is a header. The framing signals on the common wires embody the shape of the data packet in exemplary aspects. The framing signals are used by the mux, as well as the demux for handling the data packets carried on the common wires. Aspects of conflict resolution, priority assignments, etc., can be based on these framing signals. In some aspects, priority assignments may be based on the framing signals, only if the framing signals also provide priority information in addition to the shape of the data packets.

In more detail, data packets being transmitted on the tunnel may be arbitrated on a word basis or on a packet basis. Data packets which are arbitrated on a per-word basis refer to data packets which may be freely broken up across the various common wires. Data packets arbitrated per-word are not performance critical and their transmission may be interrupted at any word boundary, for example, in order to make way for a higher priority data packet. On the other hand, data packets arbitrated on a per-packet basis mean that these data packets are higher priority and need to be transmitted uninterrupted across the tunnel. If on the other hand, the arbiter were to interrupt a high priority data packet, then the corresponding FIFO would have to store-and-forward, in order to remove inserted wait cycles inserted in the data packet due to the interruption. Thus, the interruption will induce latency penalties in forwarding the data packet downstream. Thus, it is desirable to prevent the arbiter from interrupting such high priority data packets.

In order to handle these high priority data packets, a notion of an "engaged" packet may be utilized in some aspects, where an "engaged" packet refers to a high priority status of a data packet which cannot be interrupted. An engaged packet may be reshaped, but must be transmitted in an uninterrupted manner. An engaged packet may be accompanied by a framing signal which informs the corresponding downstream FIFOs to start forwarding the bits of the data packet as soon as they are received to the corresponding downstream channel. In exemplary aspects of a packet arbitrated channel, a data packet will be designated as engaged as soon as the transmission of the head of the data packet has commenced.

In exemplary aspects, it is desirable to have only a single engaged packet at a time, in order to ensure that the tunnel can accommodate the high priority transmission of this data packet. If there are multiple engaged packets, arbitration among the multiple high priority will be difficult. Accordingly, unless a destination FIFO for the channel that carries the engaged packet is full, or there is a bubble or wait cycles in the tunnel before an engaged packet for that channel enters the tunnel, it is assumed that the single engaged packet can be transmitted uninterrupted across the tunnel. This behavior ensures that when the FIFO of one channel gets full, the other channels are not impaired.

With reference to FIG. 1 a network on chip or NoC 100 is illustrated. NoC 100 includes upstream mux 102 and downstream demux 108. Channels A, B, and C on the upstream side are designated as A_u, B_u, and C_u, whereas the channels are designated as A_d, B_d, and C_d on the downstream side. Tunnel 105 implemented between mux 102 and demux 108 operates based on common signals which include data signals 104 and framing signals 106. Data signals 104 represent bits of data of the data packets being carried in tunnel 105 and framing signals 106 include information pertaining to the data transmitted on data signals 104. These common signals enable tunnel 105 to carry or transmit data packets of two or more formats on the same set of common wires. In other words, data packets of any format are represented in terms of these common signals, and thus, tunnel 105 does not need to be modified to suit the specific needs of any packet format.

Channel arbiter 126 may arbitrate among data packets supplied by the channels A_u, B_u, and C_u. Demux 108 may include FIFOs 120A, 120B, and 120C for storing data received from tunnel 105 and forwarding them on to corresponding channels A_d, B_d, and C_d.

In general, one word may be transmitted per clock cycle on tunnel 105. Mux 102 may break up a received data packet from channels A_u, B_u, and C_u into one or more fragments, wherein each fragment may comprise one or more words. Demux 108 may assemble the words received on data signals 104 from the various channels into their respective data packets by utilizing FIFOs 120A, 120B, and 120C. Since the data packets may be of different formats and priorities, framing signals 106 may be used for transmission of data packets of various formats and priorities over data signals 104.

Framing signals 106 may include several control signals pertaining to data packets transmitted on data signals 104. For example, framing signals 116 which may be transmitted from mux 102 to demux 108 may include valid signal 110, tail signal 112 (and/or a head signal, not shown), channel signal 114, and go signal 118. Combinations of these signals may have different meanings that may be used to convey information regarding the data packets transmitted on data signals 104. Framing signals 116 may also include flow control (FC) signal 116 in the reverse direction, which may be transmitted from demux 108 to mux 102. These signals and combinations thereof will now be explained in further detail.

Starting with FC signal 116, this signal may be set by demux 108, and may indicate whether demux 108 is capable of or ready to receive data on data signals 104. If only one channel were present, a simple "ready" signal may be sufficient, but in the case of illustrated aspects related to multiple channels as discussed herein, FC signal 116 represents a flow control signal per channel. In more detail, FC signal 116 includes at least one signal per channel, to control flow of traffic on that channel. Flow control can have more than one signal per channel, particularly in cases where the channels include pipeline stages and/or clock domain crossings. In such cases, framing signals 106 can include two or more flow control signals or multi-bit flow control signals, which implement "credits" or a credit-based system for flow control for each channel in either direction. For example, channel arbiter 126 may send data packets to the channels based on credits available for a particular channel, and flow control can be based on the credits per channel.

With regard to the example of a single flow control signal per channel, depending on the amount of storage space left in FIFOs 120A-C, FC signal 116 may have component signals (e.g., 116A, 116B, 116C, not shown) corresponding to channels A, B, and C respectively, where these component signals may be asserted or de-asserted on a per channel basis. If demux 108 is unable to or becomes incapable of receiving or accepting data for a particular channel, the FC signal 116 corresponding that channel will be de-asserted, which would override the remaining framing signals. In other words, if FC signal 116 for a particular channel is not asserted, then data transmission of a data word or data packet on that channel will not be transmitted from mux 102 to demux 108.

Next, valid signal 110 may indicate whether the signals on data signals 104 represent a valid word. For example, in some cases, during some a clock cycle an idle or wait cycle may be inserted in a stream of words if the channel receiving the corresponding data packet does not have data to send during that clock cycle. In such cases, valid signal 110 may be de-asserted to indicate that no valid word is being transmitted. The remaining framing signals may only be meaningful if valid signal 110 is asserted.

Tail signal 112 (when valid signal 110 is asserted) may indicate whether the word currently being transmitted is the end of its corresponding data packet. Similarly, a "head" signal may be used to indicate whether the presently transmitted word is the beginning of its corresponding data packet. Whether the depicted tail signal is used or the head signal is used may depend on the context within a data packet because they may be used to convey the same information. Accordingly, tail signal 112 may be interpreted broadly to include a tail signal or a head signal, as the case may be.

Channel signal 114 (when valid signal 110 is asserted) indicates the channel a particular word or data packet is associated with. In combination with tail signal 112, channel signal 114 may convey whether the last word of a data packet is on a particular channel, based on the manner in which the data packet was shaped by mux 102.

As previously described a "go" signal may be used for high priority or engaged packet transmission. As shown, go signal 118 (when valid signal 110 is asserted) may indicate to demux 108 that data bits or words may need to be forwarded to corresponding downstream channels A_d, B_d, or C_d as soon as they are received.

Additionally, error checks or parity signals such as error-control coding (ECC) bits may also be added as framing signals for detecting/correcting errors in data packets. The ECC bits may be transmitted on a per word basis.

In case there are conflicts between various data packets being transmitted by mux 102, channel arbiter 126 may be configured to resolve these conflicts. As described, various types of data packets, depending upon priority or quality-of-service (QoS) level, may be handled in different ways. For packet-arbitrated or engaged packets, channel arbiter 126 may set go signal 118 to indicate forwarding of words when the data packet is received at demux 102. The transfer of words associated with an engaged packet on a particular channel may only be interrupted, for example, if the FIFO for that channel in demux 108 is full, which may in turn cause the corresponding FC signal 116 for that channel to be de-asserted; or, if a bubble exists in the engaged packet before the engaged packet entered the tunnel. Since a bubble indicates that no valid words are transmitted during the bubble, the bubble may be utilized for the transmission of alternative words or data packets. For example, words of a word-arbitrated data packet may be transmitted during a bubble which was pre-existing in an engaged first data packet, prior to the engaged first data packet entering the tunnel.

If there are no data packets associated with a word-arbitrated data packet available for transmission, then a second packet-arbitrated data packet, if available for transmission, may be selected to transmit words during the bubble of the engaged first data packet. Several protocol options may be applicable in such situations. For example, in some aspects, this second data packet does not "engage" at first (i.e. this second data packet still remains with lower priority than the "engaged" first data packet). Accordingly, go signal 118 does not get asserted in relation to the second data packet in order to inform the corresponding FIFO in demux 108 that the second data packet may be issued downstream and needs to be uninterrupted. In this aspect the assumption may be that the condition causing the engaged first data packet to be stalled and introduce the bubbles may be temporary. Thus, the assumption provides that the engaged first data packet will resume transmission and potentially consume all available bandwidth of the tunnel in data signals 104. An example situation where this aspect may be applicable may involve a single bubble or empty transmission slot which exists in the engaged first data packet. Accordingly, in this example, as soon as the engaged first data packet finishes transmission over tunnel 105, the second data packet will gain the "engaged" status. Thus, arbiter 126 may, at this stage, assert go signal 118 in order to signal demux 108 when issuing the next word, which would pertain to the now-engaged second data packet.

However, in an alternative scenario, if the condition stalling the engaged first data packet persists or repeats itself, then several words of the second data packet may be transmitted over transmission slots created by bubbles of the engaged first data packet. In this scenario, it may be desirable to promote the second data packet to "engaged" status before the stalled engaged first data packet has finished transmission.

One or more protocol options to promote the second data packet to engaged status prior to completion of transmission of the stalled engaged first data packet will now be described. In one option, a decision to promote the second data packet to engaged status may be based on the number of words that have been transmitted by the second data packet during the period when the engaged first data packet was stalled (i.e., during the bubbles). If this number of already transmitted words of the second data packet becomes higher than the number of words that were transmitted by the engaged first data packet before the engaged first data packet stalled, then the second data packet may be promoted to engaged status. In some optional aspects, the first data packet may be demoted from its engaged status if the second data packet is promoted to engaged status. Channel arbiter 126 may assert go signal 118 to inform demux 108 that the second data packet is engaged, and thus, the engaged second data packet will then be given the highest priority for transmission, or at least as high a priority as the engaged first data packet was afforded.

Another protocol option pertains to promoting the second data packet to engaged status if a number of transmitted words of the second data packet exceeds a predefined threshold (i.e., in this case, the predefined number of transmitted words of the second data packet is not based on any comparison with the number of transmitted words of the first data packet). This threshold may be based on or equal to the depth or number of entries of the FIFOs in demux 108, for example. This means that if a FIFO is full, demux 108 will have to start transmitting the head of a current data packet (e.g., the stalled engaged first data packet) whose words are occupying the FIFO, in order to avoid a deadlock. Accordingly, demux 108 will need to ensure that the current data packet will be transmitted as soon as possible, in order to avoid inserting bubbles during further transmission of the second data packet. For this case, it will be appreciated that if the FIFOs are larger than a maximum data packet size, then only a single data packet will ever be engaged. On the other hand, if the FIFOs are smaller than the maximum data packet size, then two or more data packets can become engaged. However, two or more data packets gaining engaged status is likely to be a very rare event if the FIFO size is larger than an average data packet length. Thus, in some aspects, the sizes of buffers or the sizes of the FIFOs may be designed based on an average data packet length to minimize the possibility of two or more data packets gaining engaged status at the same time.

Figure 2:
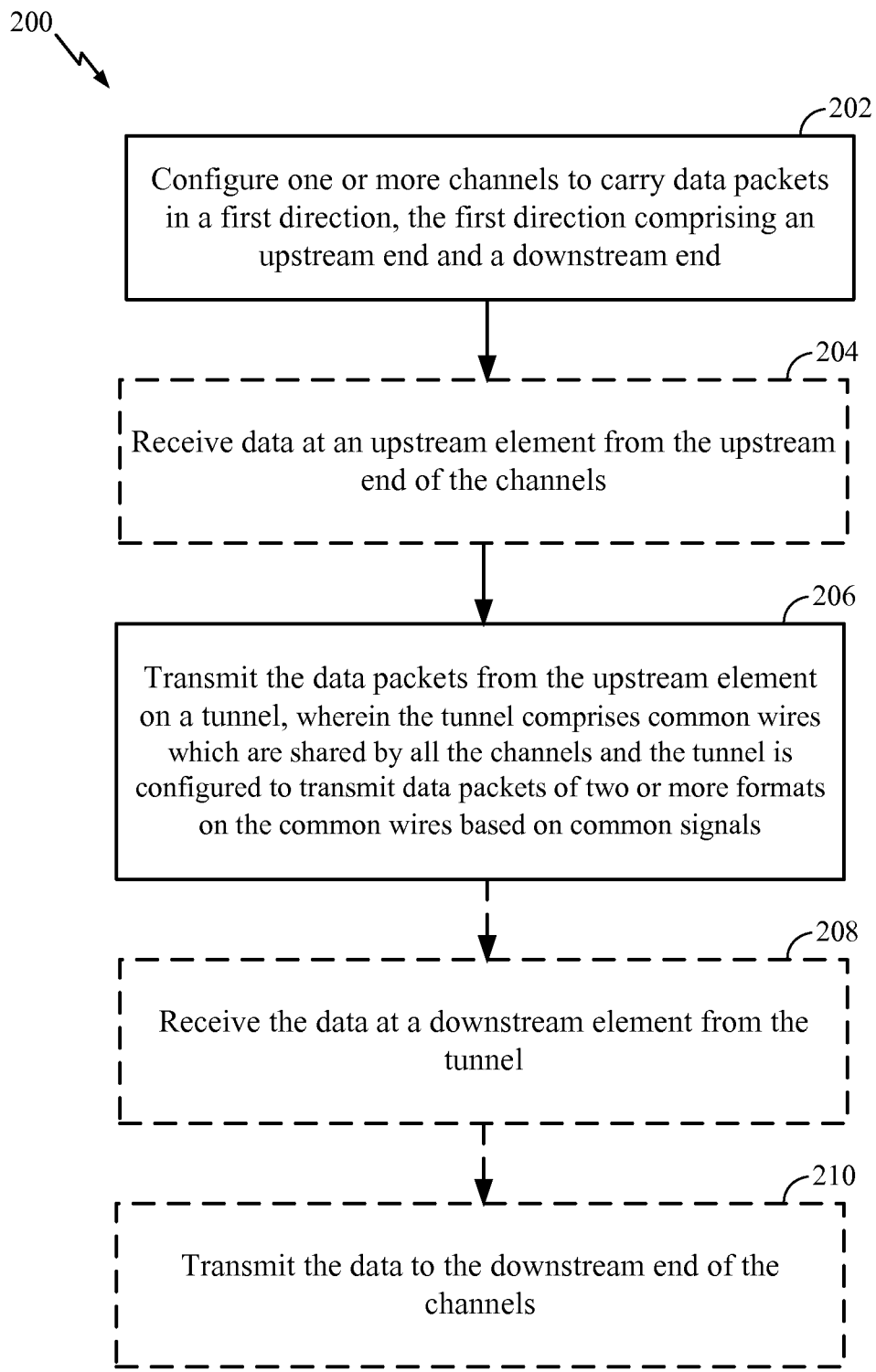
FIG. 2 is a flow-chart illustration of an exemplary method for data communication between a sender and a receiver.

It will be appreciated that embodiments include various methods for performing the processes, functions and/or algorithms disclosed herein. For example, as illustrated in FIG. 2, an embodiment can include a method (200) of operating a network on chip (e.g., NoC 100), the method comprising: configuring one or more channels (e.g., A, B, C) to carry data packets in a first direction, the first direction comprising an upstream end and a downstream end—Block 202; and transmitting the data packets from an upstream element at the upstream end to a downstream element at the downstream end on a tunnel (e.g., tunnel 105), wherein the tunnel comprises a common wires (e.g., data signals 104 and framing signals 106) common to all the channels and the tunnel is configured to transmit data packets of two or more formats on the common wires based on common signals—Block 206. As shown in dotted lines, the method can also include the further steps of receiving the data packets at the upstream element (e.g., mux 102) from the upstream end of the channels (e.g., A_u, B_u, C_u)—Block 204; receiving the data at the downstream element (e.g., demux 108) from the tunnel—Block 208; and transmitting the data to the downstream end of the channels (e.g., A_d, B_d, C_d)—Block 210.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for tunneling within a network-on-chip topology. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A network on chip (NoC) comprising:
one or more channels configured to carry data packets in a first direction, the first direction comprising an upstream end and a downstream end; and
a tunnel configured between an upstream element at the upstream end and a downstream element at the downstream end;
wherein the tunnel comprises common wires which are shared by the one or more channels and the tunnel is configured to transmit data packets of two or more formats on the common wires using common signals,
wherein the common signals comprise data signals to transmit one or more of data, control, or debug information belonging to the data packets on the common wires, and framing signals to control transmission of the data signals on the common wires,
wherein the framing signals transmitted in the first direction comprise a go signal to indicate an engaged status of the data packet, wherein the engaged status represents a high priority status to indicate that the data packet transmission on the tunnel should not be interrupted,
wherein the transmission of an engaged first data packet is not interrupted, unless the downstream element becomes incapable of receiving and forwarding words of the engaged first data packet to the downstream end of the corresponding channel or if the engaged first data packet has pre-existing bubbles before entering the upstream element, and
wherein the engaged first data packet is reshaped.

2. The NoC of claim 1, wherein the framing signals transmitted in the first direction further comprise one or more of a valid signal to indicate whether a data packet comprising one or more words transmitted on the tunnel is valid, a tail signal to indicate a last word of the data packet, a head signal to indicate a first word of the data packet, and a channel signal to indicate the channel corresponding to the data packet.

3. The NoC of claim 1, wherein the upstream element is configured to transmit words of a second data packet when the transmission of the engaged first data packet is interrupted.

4. The NoC of claim 3, wherein the upstream element is configured to promote the second data packet to engaged status if a number of transmitted words of the second data packet exceeds a predefined threshold or a number of transmitted words of the engaged first data packet prior to interruption of transmission of the engaged first data packet.

5. The NoC of claim 4, wherein the predefined threshold is based on a size of buffers implemented in the downstream element, the buffers configured to store data received from the tunnel and forward the received data to the downstream end of the channels.

6. A method of operating a network on chip (NoC), the method comprising:
configuring one or more channels to carry data packets in a first direction, the first direction comprising an upstream end and a downstream end; and
transmitting the data packets from an upstream element on the upstream end to a downstream element on the downstream element on a tunnel comprising common wires which are shared by the one or more channels,
wherein transmitting the data packets comprises transmitting data packets of two or more formats on the common wires of the tunnel, using common signals,
wherein the common signals comprise data signals to transmit one or more of data, control, or debug information belonging to the data packets on the common wires, and framing signals to control transmission of the data signals on the common wires,
wherein the framing signals transmitted in the first direction comprise a go signal to indicate an engaged status of the data packet, wherein the engaged status represents a high priority status to indicate that the data packet transmission on the tunnel should not be interrupted;
preventing interruption of the transmission of an engaged first data packet, unless the downstream element becomes incapable of receiving and forwarding words of the engaged first data packet to the downstream end of the corresponding channel or if the engaged first data packet has pre-existing bubbles before entering the upstream element, and
wherein the engaged first data packet is reshaped.

7. The method of claim 6, wherein the framing signals further comprise one or more of a valid signal to indicate whether a data packet comprising one or more words transmitted on the tunnel is valid, a tail signal to indicate a last word of the data packet, a head signal to indicate a first word of the data packet, and a channel signal to indicate the channel corresponding to the data packet.

8. The method of claim 6, comprising transmitting words of a second data packet when the transmission of the engaged first data packet is interrupted.

* * * * *